(12) United States Patent
Tachibana et al.

(10) Patent No.: US 6,657,641 B2
(45) Date of Patent: Dec. 2, 2003

(54) SCENARIO DISPLAY METHOD AND APPARATUS

(75) Inventors: Masahiro Tachibana, Yokohama (JP); Yuichi Mashita, Kawasaki (JP); Katsuhiko Yuura, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/949,119

(22) Filed: Sep. 10, 2001

(65) Prior Publication Data

US 2002/0012009 A1 Jan. 31, 2002

Related U.S. Application Data (63) Continuation of application No. 09/216,720, filed on Dec. 21, 1998, now abandoned.

(51) Int. Cl.[7] .................................................. G06F 3/14
(52) U.S. Cl. ...................... 345/751; 345/835; 345/757; 345/758; 345/764
(58) Field of Search ................................ 345/835, 757, 345/758, 764, 751, 836

(56) References Cited

U.S. PATENT DOCUMENTS

| | | | |
|---|---|---|---|
| 5,729,253 A | 3/1998 | Mashita et al. ............. 345/352 |
| 5,729,471 A * | 3/1998 | Jain et al. .................... 345/419 |
| 5,745,126 A * | 4/1998 | Jain et al. ...................... 348/42 |
| 5,774,122 A | 6/1998 | Kojima et al. ............... 345/355 |
| 5,850,352 A * | 12/1998 | Moezzi et al. ............... 345/419 |
| 5,898,430 A | 4/1999 | Matsuzawa et al. ......... 345/302 |
| 6,005,576 A * | 12/1999 | Kojima et al. ............... 345/810 |
| 6,040,841 A | 3/2000 | Cohen et al. ................ 345/473 |
| 6,072,478 A * | 6/2000 | Kurihara et al. ............. 345/473 |
| 6,119,147 A | 9/2000 | Toomey et al. .............. 709/204 |

* cited by examiner

Primary Examiner—Kristine Kincaid
Assistant Examiner—Thomas T. Nguyen
(74) Attorney, Agent, or Firm—Antonelli, Terry, Stout & Kraus, LLP (57) ABSTRACT

A scenario display method, apparatus and computer program for displaying in a current scene, included as one of a plurality of sequential scenes of a scenario, information indicating relations between the current scene and scenes occurring before and after the current scene. Relation information is stored indicating relations between actors, resources and actions performed by the actors on the resources with respect to the scenes. Information of a current scene including actors, resources and actions performed by the actors on the resources is displayed. A retrieval operation is performed to retrieve information indicating relations between the resource of the current scene and actions performed on the resources of the current scene by actors in scenes occurring before and after the current scene. The retrieved information is displayed in the current scene.

22 Claims, 8 Drawing Sheets

FIG. 2

Scenario information memory unit
13

200

| Scene position | Action name |
|---|---|
| 1 | Action 210 |
| 2 | Action 211 |
| 3 | Action 212 |
| 4 | Action 213 |
| 5 | Action 214 |
| 6 | Action 215 |

201

| Action name | Actor name |
|---|---|
| Action 210 | Actor 220 |
| Action 211 | Actor 221 |
| Action 212 | Actor 222 |
| Action 213 | Actor 223 |
| Action 214 | Actor 224 |
| Action 215 | Actor 225 |

202

| Action name | Resource name | Access type |
|---|---|---|
| Action 210 | Resource 220 | Renewal |
| Action 210 | Resource 221 | Renewal |
| Action 211 | Resource 220 | Renewal |
| Action 211 | Resource 221 | Renewal |
| Action 212 | Resource 220 | Reference |
| Action 212 | Resource 221 | Renewal |
| Action 213 | Resource 220 | Reference |
| Action 213 | Resource 221 | Reference |
| Action 214 | Resource 220 | Renewal |
| Action 214 | Resource 221 | Renewal |
| Action 215 | Resource 220 | Reference |
| Action 215 | Resource 221 | Reference |

FIG. 3A 300

| Resource name | Closest scene position that there is renewal before a scene position at present |
|---|---|
| Resource 220 | 2 |
| Resource 221 | 2 |

FIG. 3B 301

| Resource name | Closest scene position that there is renewal after a scene position at present |
|---|---|
| Resource 220 | NULL |
| Resource 221 | 5 |

FIG. 3C 302

| Resource name | Closest scene position that there is reference after a scene position at present |
|---|---|
| Resource 220 | 4 |

SCENARIO DISPLAY METHOD AND APPARATUS

This is a continuation of application Ser. No. 09/216,720, filed Dec. 21, 1998, now abandoned.

TECHNICAL FIELD

The present invention relates to a scenario display method, apparatus and computer program. More particularly, the present invention relates to a scenario display method, apparatus and computer program for providing information concerning the relationship between the scenes of the scenario.

BACKGROUND OF THE INVENTION

A business process, for example, has a sequential flow of images which are formed into units called scenes. There has been proposed a method and apparatus for displaying a scene on a display. A scenario includes a series of scenes. When business specifications of a flow of a business process are described using diagrams, it is easy to understand a business process while it is being developed. These diagrams are visually displayed. A method of supporting a system design and development of a business process using a display has been proposed.

There has been proposed a development support method of representing a sequential flow of a business process by displaying a scenario having a series of scenes. When displaying business specifications on a display, work that is executed where an actor (operation chief) accesses a resource (information resources) can be represented. Thus, in the scenario the actor accesses information of a current scene that is stored in a storage (resource). Care must be taken so that the resource is properly accessed since the information in the resource can be affected by accesses that occur before and after the current scene. Thus, the information of a resource in a current scene may be dependent on actions performed on the resource before and after the current scene. Such information is not displayed to the operator of the display apparatus so that the business process and how is influenced can be easily understood.

Various conventional techniques for displaying scenarios have been proposed in, for example, U.S. Pat. No. 5,729,253. However, none of these conventional techniques provide for the display of-dependent or relation information.

SUMMARY OF THE INVENTION

The present invention provides a method, apparatus and computer program for indicating in a current scene of a scenario including a plurality of scenes information indicating dependence relation between resources in the current scene and actions performed by actors on the resource in scenes that occur before and after the current scene.

A resource can be, for example, a slip, display screen information, a file, storage etc. Actions performed on the resource by an actor can be, for example, by a human who accesses a resource and executes specified work and processing, a computer, a computer program, etc. The actions performed on the resource by the actor can be, for example, one of reference (e.g., reading analyzing or renewal (e.g., writing, modifying). A scene, included as one of a plurality of scenes of a scenario, displays an action according to a sequential flow of a business process. The scene includes information of an action, an actor and a resource.

The present invention provides a scenario display method, apparatus and computer program for displaying in a current scene, included as one of a plurality of sequential scenes of a scenario, information indicating relations between the current scene and scenes occurring before and after the current scene. In the present invention, relation information is stored indicating relations between actors, resources and actions performed by the actors on the resources with respect to the plurality of scenes of the scenario. Information of a current scene including actors, resources and actions performed by the actors on the resources is displayed. Thereafter, a retrieval operation is performed to retrieve information indicating relations between the resources of the current scene and actions performed on the resources of the current scene by actors in scenes occurring before and after the current scene. The retrieved information, indicating relations between the resources of the current scene and actions performed on the resources of the current scene by actors in scenes occurring before and after the current scene, is displayed in the current scene.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which.

DETAILED DESCRIPTION OF THE PREFERRED EMBODIMENTS

Figure 1:
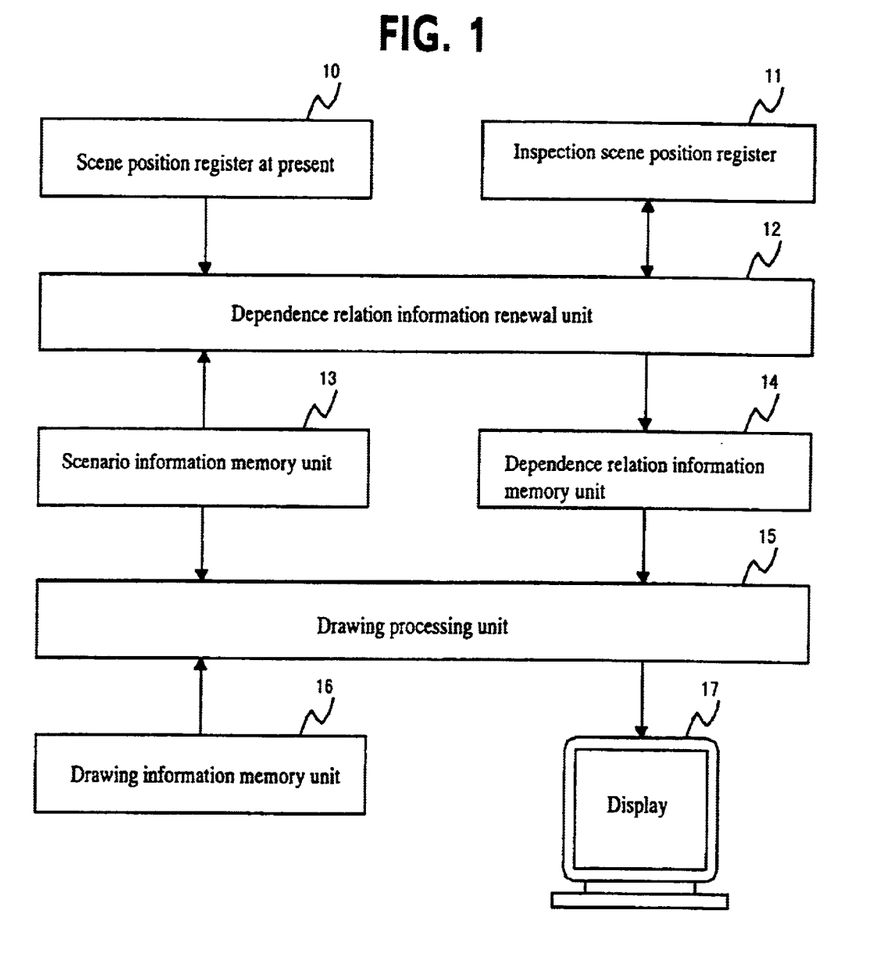
FIG. 1 illustrates a structure of an information processing apparatus that implements the present invention.

FIG. 1 is a diagram of an information processing apparatus which operates as the scenario display apparatus of the present invention. Scene position register 10 is a memory area established on the main storage of this apparatus. The scene position register 10 stores information which indicates the position of a current scene. Inspection scene position register 11 is a memory area established on the main storage. The inspection scene position register 11 stores information which indicates the position of a scene being inspected.

The scene position information is a number identifying one of the plurality of scenes included in a scenario. Information in the current scene dependence relation to information in other scenes occurring before and after the current scene at present. Scenario information memory unit 13 is a memory area on the main storage or external storage of the information processing apparatus for storing information of the scenario including information in each of the scenes. Resource information of each scene, an action being executed in each scene and an actor that executes the action in each scene may be stored in the scenario information memory unit 13. Dependence relation information memory unit 14 is a memory area on the main storage or the external storage of the information processing apparatus for storing information indicating relations between the actors, resources and actions performed by the actors on the resources for each of the scenes. Information of a closest scene position where there is a renewal or reference that precedes the current scene position, and a closest scene position where there is a renewal or reference that succeeds the current scene position can be stored in dependence relation information memory unit 14.

Drawing information memory unit 16 is a memory area on the main storage or the external storage of the information processing apparatus for storing information of a current scene to be displayed. Information of a display position including the shape of a resource that is accessed and an actor that executes the action, a figure representative of an access operation against a resource, and drawing information of a display position of a current scene can be stored in drawing information memory unit 16. Information of a shape and figure of an object and a display position of an access operation being executed on a resource in the current scene, an actor having a dependence relation to the current scene and an action being performed by the actor on the resource in the scenes before and after the current scene can be stored in the drawing information memory unit 16.

Display 17 is connected to the drawing processing unit 15. An actor, resource, and drawing information that describes the access operation resource in a current scene are displayed on display 17.

The computer program executed by the dependence relation information renewal unit 12 and the drawing processing unit 15 for processing a drawing is stored in the main storage. Dependence relation information renewal unit 12 retrieves scenario information from the scenario information memory unit 13. The current scene position is stored in scene position register 10. Then, the current scene is set to the current scene position. The current scene is set to the center, and the position of preceding and succeeding scenes that are in dependence relation as per a resource of the current scene is determined.

The position of preceding and succeeding scenes is stored in the dependence relation information memory unit 14. The inspection scene position register 11 is used as a register for indicating areas of the display or particular scenes in which work is to be performed by the operator. Drawing processing unit 15 refers to scenario information memory unit 13 and executes a processing to display and perform actions in and with respect to the current scene. An actor is represented on the display as executing an action with respect to a resource. Specifically, the resource is accessed and a reference or renewal action is performed. The drawing information output by the drawing processing unit 15 is stored in drawing information memory unit 16 and displayed on display 17. The drawing processing unit refers to information stored in the scenario information memory unit 13 and the dependence relation information memory unit 14.

The type of access operation that is performed on a resource, and the actor name of the actor performing the action and an actor is displayed and relation information indicating the name of the actor, and the type of access operation performed on the resource, in the current scene, in scenes that occurs before and after the current scene is requested. Drawing information based on the relation information is generated and stored in drawing information memory unit 16. The drawing information is then displayed on display 17 along with the current scene.

Figure 2:
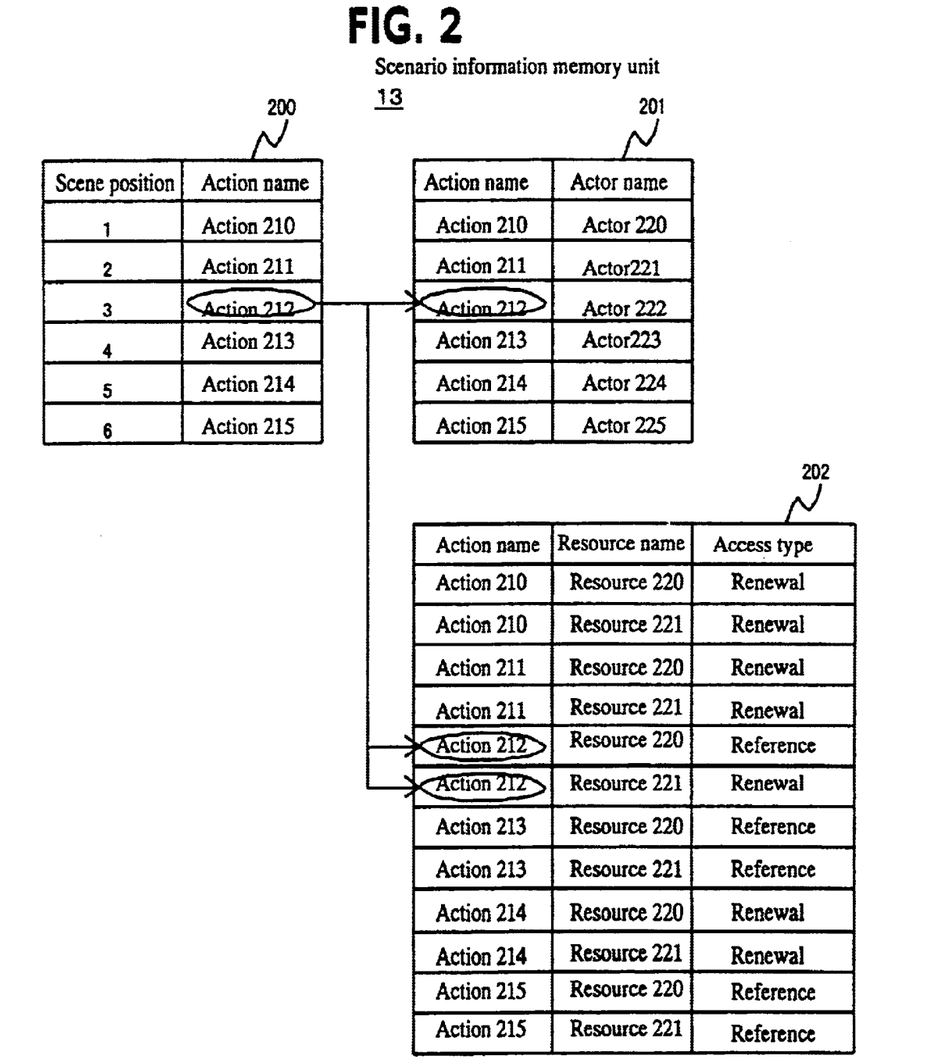
FIG. 2 illustrates an example of information stored in a scenario information memory unit 13 of the information processing apparatus.

FIG. 2 is a diagram showing an embodiment of the information stored in the scenario information memory unit 13. Information indicating correspondence between a scene position and an action name is stored in table 200. Table 200 stores a number of each scene that appears in sequential order from a first scene and the action name of the action that is executed in the respective scene. Information indicating a correspondence between an action name and an actor name is stored in table 201. Table 201 stores with respect to each action an actor name of an actor that executes the action. Information indication a correspondence between an action name, a resource name and an access type is stored in table 202. Each entry of table 202 stores information indicating whether a reference or renewal access action has been performed on the resource. The entry of table 202 is arranged in an order corresponding to an action name. For example, as indicated in table 200 an action 212 is executed on a scene at scene position 3. As per table 201 an actor 222 participates in action 212 executed on the scene at scene position 3. As per table 202 the action 212 performs a reference action on resource 220 and then, a renewal action on resource 221.

Figure 3A:
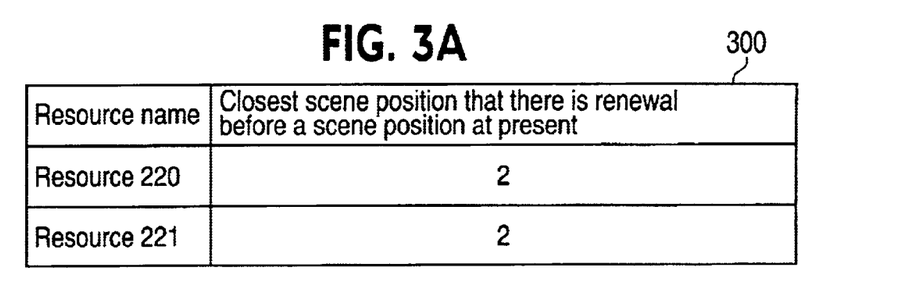
FIGS. 3A–C illustrate an example of information stored in the dependence relation information memory unit 14 of the information processing apparatus.
Figure 3B:
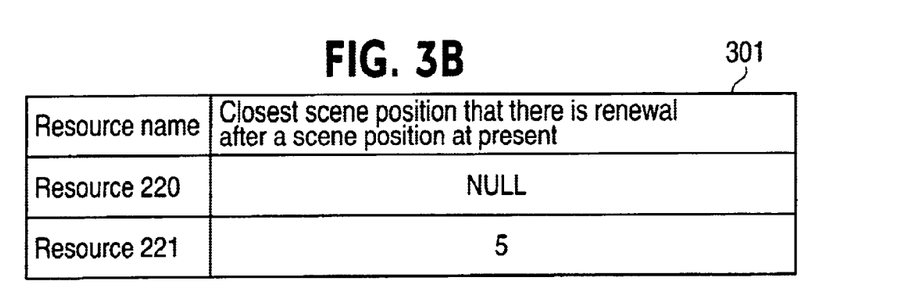
Figure 3C:
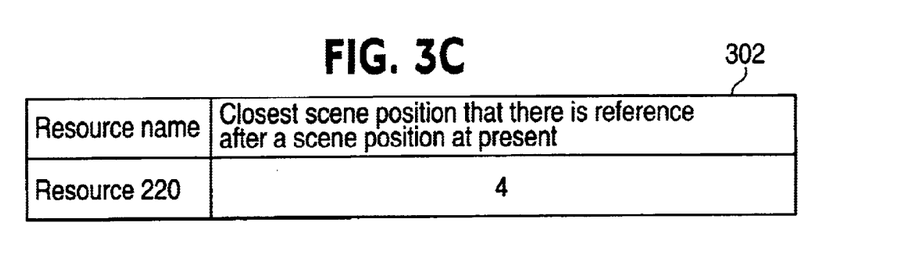

FIGS. 3A–C illustrate embodiments of the information stored in the dependence relation information memory unit 14. As shown in FIGS. 3A–C the dependence relation information includes tables 300, 301 and 302. Information indicating a correspondence between a resource name and the closest scene position where there is renewal before a current scene position is stored in table 300. That is, the position of each scene closest to a current scene when a resource is renewed for every resource that is accessed in the current scene is stored. Information indicating a correspondence between a resource name and the closest scene position that there is renewal succeeding a current scene position is stored in table 301. That is, the position of a scene after a current scene and closest to a current scene when a resource is renewed for every resource that is accessed in the current scene is stored. NULL is initialized information. Information indicating a correspondence between a resource name and a scene position where there is reference succeeding a current scene position is stored in table 302. That is, the scene position that is referred to with the identifier of the resource that is referred to in the scene after a current scene for every resource that is accessed in the current scene is stored. Thus, by use of tables 300–302, the state of renewal or reference of a resource in the sequential order of the scenes can be acquired.

Drawing processing unit 15 refers to tables 200–202 of scenario information memory unit 13 so as to acquire the resource name of the resource that is accessed when the action identified by action name is applied to a current scene position, an actor name of an actor that executes the action and the type of action or access. The drawing processing unit acquires from the drawing information unit drawing information that indicates a position of the icon that represents an actor and a resource and displays such information. The drawing processing unit 15 then generates drawing information that shows a position of the figure that describes an operation when an actor accesses a resource and displays such information.

Figure 4:
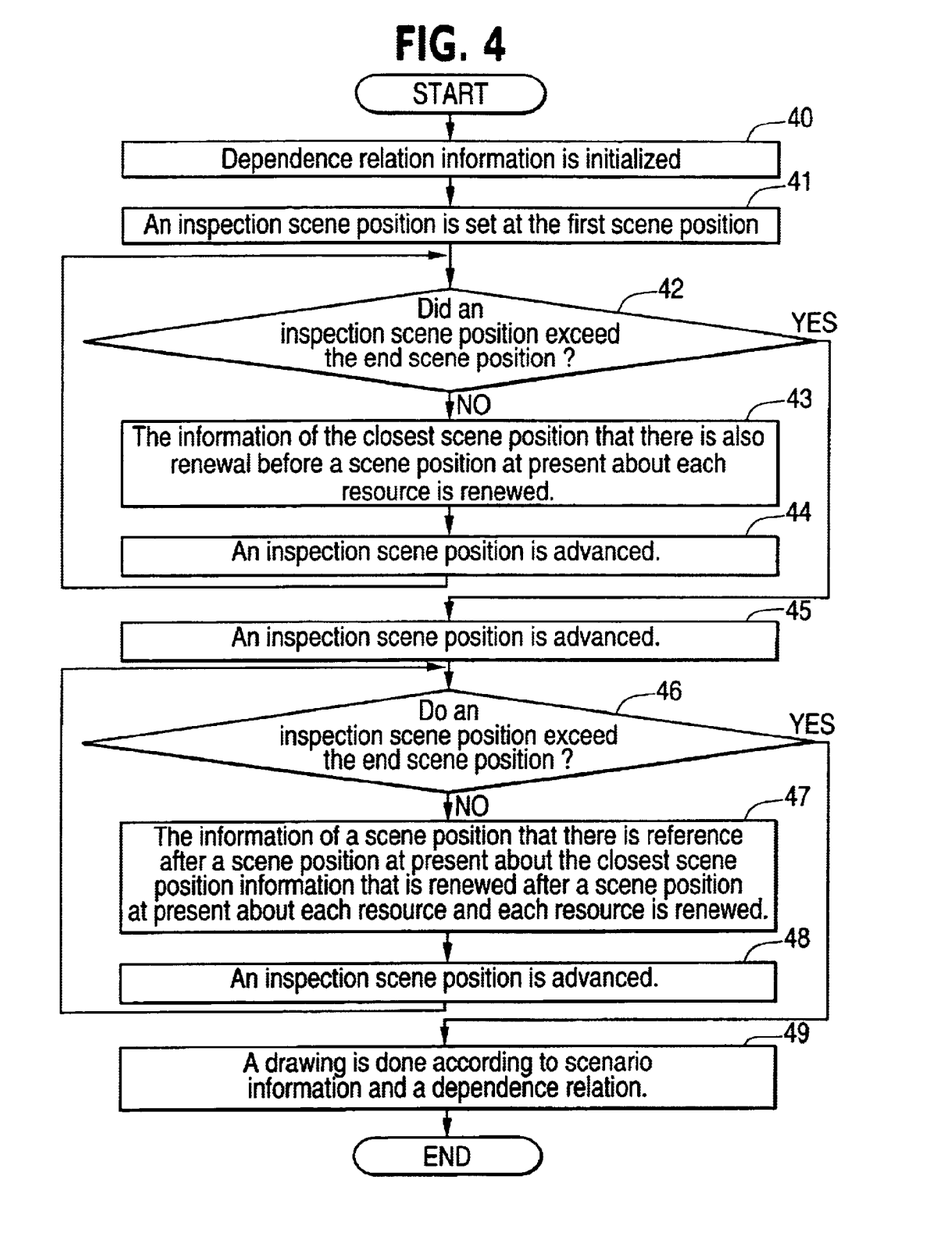
FIG. 4 is a flowchart which illustrates a processing procedure implemented by the dependence relation information renewal unit 12 and the drawing processing unit 15.

FIG. 4 is a flowchart that illustrates a processing procedure performed by the dependence relation information renewal unit 12 and the drawing processing unit 15. Each of the steps of the flowchart can, for example, correspond to one or more instructions of a computer program which can, for example, be stored on floppy, CD ROM, storage device, etc. Steps 40–48 are a processing procedure of the dependence relation information renewal unit 12, and step 49 is the processing procedure of the drawing processing unit 15. Dependence relation information renewal unit 12 initializes relation information of dependence in the dependence relation information memory unit 14 that has plural entries concerning all resources or some resources (step 40). That is, NULL is set at table 300 for all resources. Thus, NULL is set at the closest scene position when there is renewal preceding a scene position in table 300. Then, NULL is set at the closest scene position of table 301 where there is renewal preceding a scene position. All entries that includes the resource names of the scene position of table 302 where there is reference succeeding a current scene position and a scene position are deleted. Then, the first scene position, that is, 1 is set at inspection scene position register 11 (step 41). The contents of scene position register 10 are compared with the contention of the inspection scene position register 11. It is then judged whether an inspection scene position is the same as the current scene position (step 42). It is judged that the inspection scene position is the same as the current scene position processing proceeds to step 45. If not processing proceed to step 43. If the inspection and current scene position are not the same, each resource that is accessed in the current scene in the information of table 300 is renewed (step 43). This place is the closest scene of table 300 where there is renewal before a current scene position.

Figure 5:
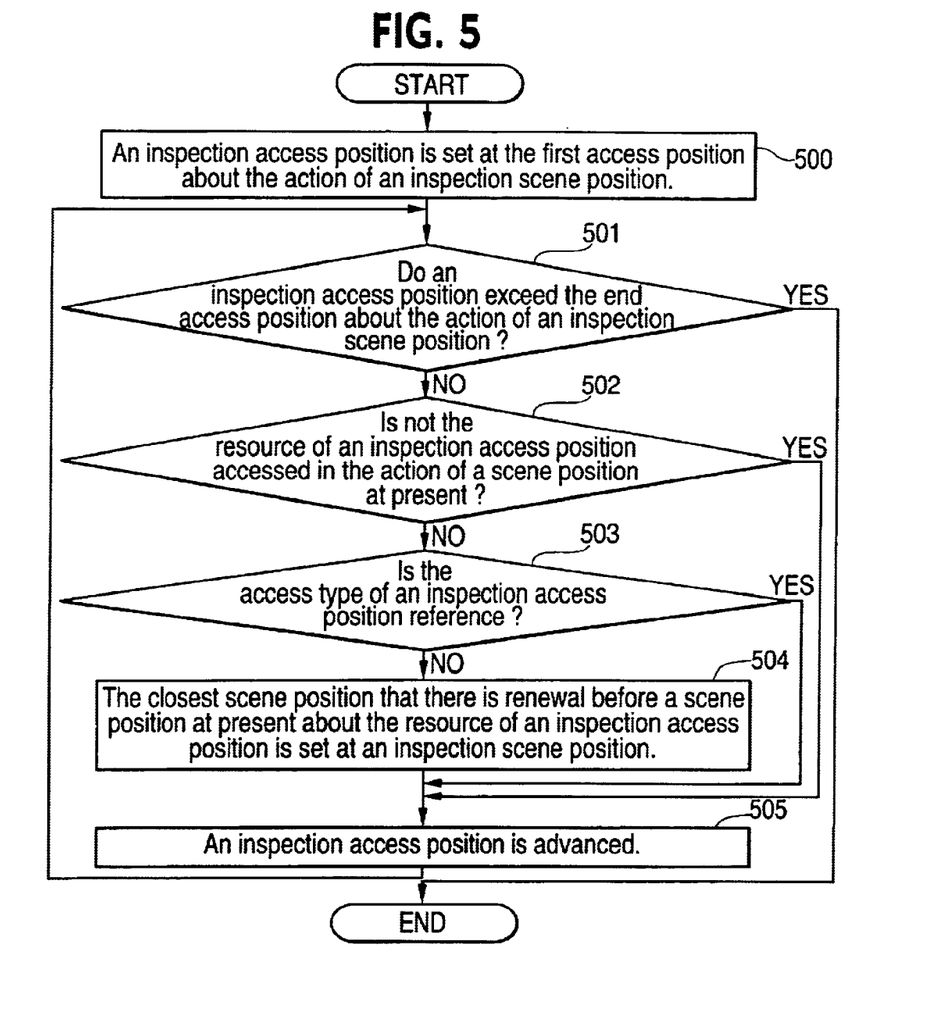
FIG. 5 is a flowchart which illustrates the details of the processing of step 43 of the flowchart illustrated in FIG. 4.

The details of processing of step 43 as illustrated in the flowchart of FIG. 5. An inspection scene position is advanced (step 44) and the processing returns to step 42 by adding 1 to the inspection scene position register 11. If it is judged that an inspection scene position is the same as the current scene position (step 42) then 1 is added to inspection scene position register 11 (step 45). Thus, an inspection scene position is advanced. Then, it is judged whether an inspection scene position exceeds the end scene position (step 46). The information of each resource that is accessed in the current scene if the end scene position has not been exceeded (step 46) is renewed (step 47).

Figure 6:
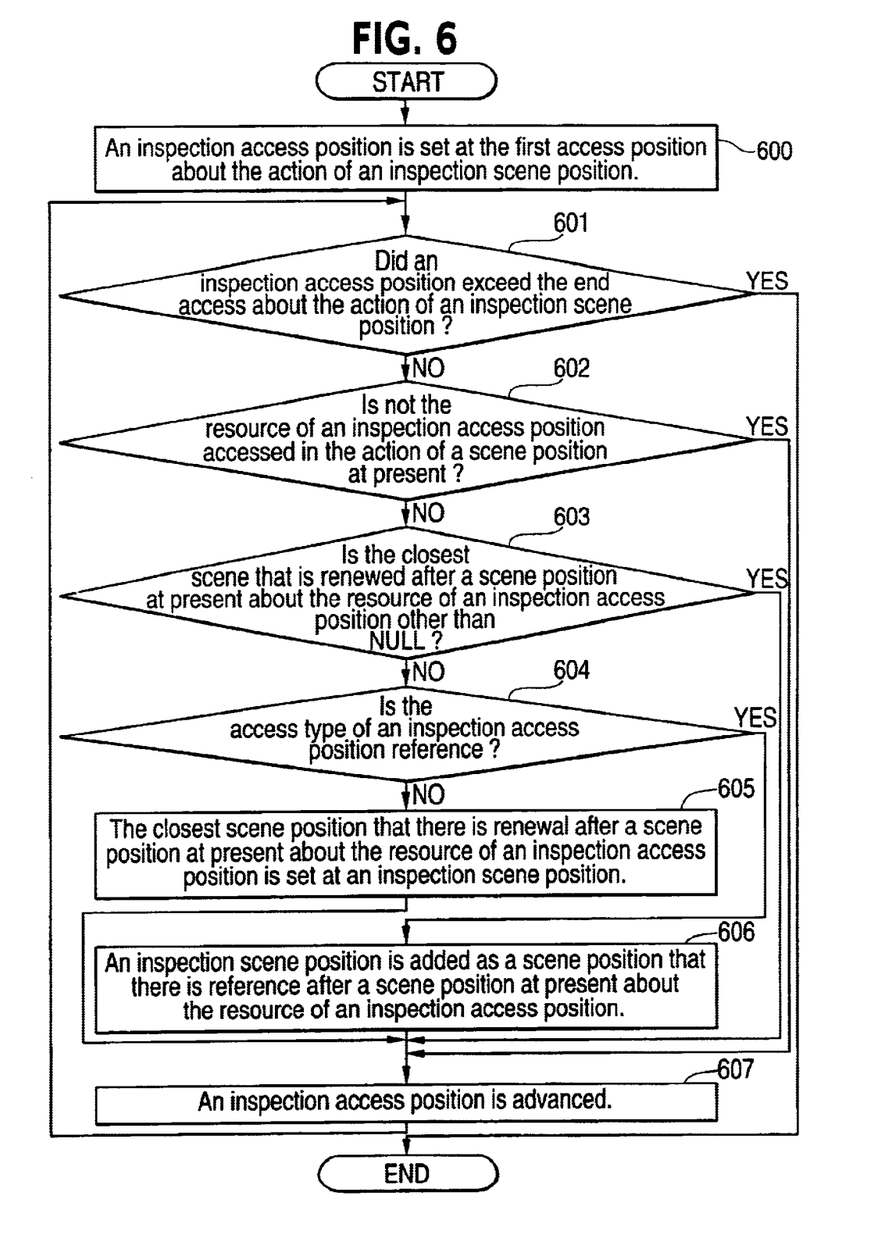
FIG. 6 is a flowchart which illustrates the details of the processing of step 47 of the flowchart illustrated in FIG. 4.

That is, the information of the scene position of the closest scene position of table 301 and table 302 that is renewed after a current scene position where there is reference after a current scene position is renewed. The details of step 47 are illustrated in FIG. 6. Then, an inspection scene position is advanced (step 48) and processing returns to step 46 by adding 1 to the inspection scene position register 11. If it is judged that an inspection scene position exceeded the end scene position (step 46), then drawing processing unit 15 refers to the scenario information of scenario information memory unit 13 and the dependence relation information of dependence relation information memory unit 14.

When an inspection scene position exceeds the end scene position, drawing processing unit 15 refers to the scenario information of scenario information memory unit 13 and dependence relation information of the dependence relation information memory unit 14. Drawing information that describes the access operation against these resources that an actor appearing in the current scene performs is stored in drawing information memory unit 16. Such drawing information is displayed on display 17 (step 49).

FIG. 5 is a flowchart illustrating the details of step 43. Each of the steps of the flowchart can, for example, correspond to one or more instructions of a computer program which can, for example, be stored on floppy, CD ROM, storage device, etc. Dependence relation information renewal unit 12 sets the position (first access position) of the first entry of the action of an inspection scene position at an inspection access position in table 202 of scenario information memory unit 13 (step 500). The inspection access position is a temporary register in the main storage. When table 200 is retrieved by an inspection scene position, a corresponding action name is obtained. Table 202 is retrieved by this action name, and the number of the first entry with which the action name corresponds is set to the first access position.

This number is set at an inspection access position. It is then judged whether an inspection access position exceeds the end access position of the relevant action of a next inspection scene position (step 501). If it is judged that the end access position has not exceeded (step 51), each resource name of the relevant entry is accessed in the action of a current scene position and it is judged whether the access type of the relevant entry is a reference action for the resource (step 502) that is accessed in the current scene (step 503). An inspection scene position is set at a resource where table 300 indicates a resource that is at the inspection access position if an access type is renewal (step 504). This inspection scene position becomes the closest scene position where there is renewal before a current scene position.

Then, an inspection access position is advanced (step 505) and processing returns to step 501 by adding 1 to an inspection access position. When the resource of an inspection access position is not accessed in the action of a current scene position (step 502), processing proceeds to step 505. If the access type of the resource of an inspection access position is reference (step 503), processing proceeds to step 55. If an inspection access position exceeds the end access position of the relevant action (step 501), processing is ended. Until an inspection scene position is the same as a current scene position, the processing of steps 43 and 44, are repeatedly executed. Then, an inspection scene position is set or is addressed at table 300 of each resource that is accessed in the current scene. Finally, information of the closest scene position where there is renewal before a current scene position is stored.

FIG. 6 a flowchart which illustrates the details of step 47. Each of the steps of the flowchart can, for example, correspond to one or more instructions of a computer program which can, for example, be stored on floppy, CD ROM, storage device, etc. The dependence relation information renewal unit 12 sets the first access position of the action of an inspection scene position at an inspection access position to the entry of table 202 of the scenario information memory unit 13 (step 600). It is judged whether the inspection access position exceeds the end access position of the relevant action of next inspection scene position next (step 601). If it is judged that the end access position has not been exceeded (step 61), each resource name of the relevant entry is accessed in the action of a current scene position (step 602). If the resource that is accessed in the current scene at present, as per table 301 is referred to (step 602), then it is judged whether the closest scene position where there is renewal after a current scene position is other than NULL for the relevant resource (step 603). If it is judged that the access type of the relevant entry is a reference thereby having a NULL (step 63) it is then judged whether the access type of an inspection access position is a reference (step 64).

The inspection scene position of the inspection scene position register 11 is set to the closest scene position of a resource, as per table 301, that corresponds to a resource that is at the inspection access position if an access type is renewal, when the renewal is after a current scene position (step 605). Then, processing proceeds to step 607. An inspection scene position is added to the entry that has the relevant resource name in table 302 of a resource if the access type is a reference (step 606). An inspection access position is advanced (step 607) and processing returns to step 601 by adding 1 to an inspection access position.

When the resource of an inspection access position is not accessed in the action of a current scene position (step 602) processing proceeds to step 607. When the resource of an inspection access position is not accessed in the action of a current scene position (step 62) processing procedures to step 607. If a scene position other than NULL is already stored (step 603), corresponding to the relevant resource of table 301, processing proceeds to step 607. If an inspection access position exceeds the end access position of the relevant action (step 601), processing is ended.

Until an inspection scene position exceeds the end scene position, steps 47 and 48, are repeatedly executed. Then, a first scene position where there is renewal, as per table 301 after a scene position of each resource that is accessed in the current scene is set. All scene positions that correspond with the resource name that is referred to are set at even setting of a scene position of each resource that is accessed in the current scene table 301 to table 302. First, a resource is renewed after a current scene position after setting a scene position at table 301 once. After that, even if the resource is referred to, an entry is not added to table 302.

Drawing processing unit 15 refers to tables 300–302 of the dependence relation information memory unit 14 in processing step 49 and acquires the scene position of the current scene and dependence relation. Then, a current difference with renewal before a scene, later renewal or later reference is acquired (the resource name of the resource that is accessed in the scene). An actor name of an actor that appears on the scene that is in the dependence relation that refers to tables 200 and 201 of scenario information memory unit 13 is acquired. Then, the drawing information of an actor of the scene that is in the dependence relation at present that is stored in drawing information memory unit 16 and the access operation is added to drawing information of the scene and indicated on display 17.

Figure 7:
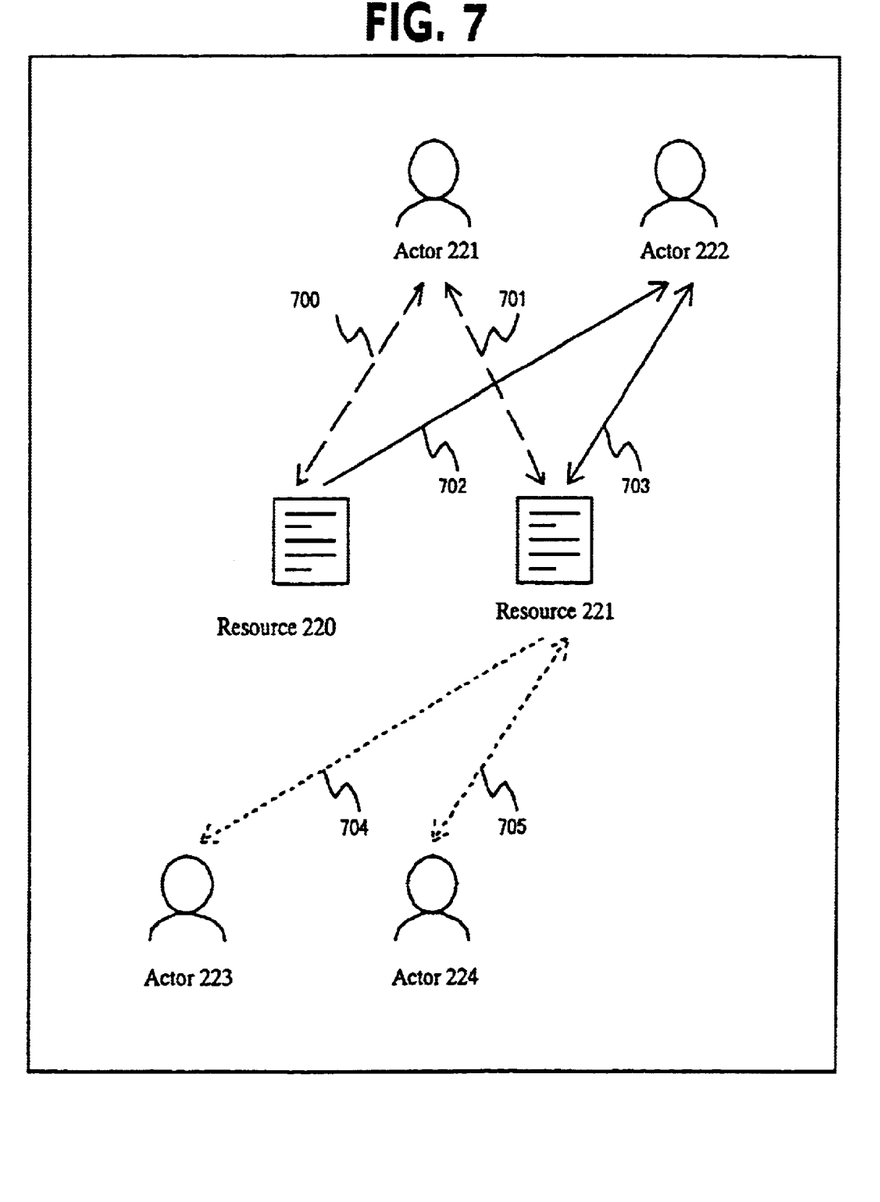
FIG. 7 illustrates an example of a display of related and dependence information of a current scene.

FIG. 7 is a diagram illustrating an embodiment of the operation of an actor of the scene and a current dependence relation as shown on display 17, a resource and an actor which perform an action on the resource. The one way arrow shows the reference from an actor to the resource. A bidirectional arrow shows the renewal from an actor to the resource. In the action of a scene, an actor 222 refers to resource 220. Once complete, the action 222 performs a renewal of resource 221. The display further shows that in the former scene, an actor 221 renews resource 220 and resource 221 and in the later scene, an actor 223 refers to resource 221, and an actor 224 renews resource 220 and resource 221. The solid line arrow shows access operation of a current scene. The broken line arrow shows access operation of a current scene before the current scene. The dotted line arrow shows access operation of a scene after the current scene. The access operation of an actor to a resource of a current scene, the access operation of an actor to a resource of a scene before the current scene and the access operation to a resource of a scene after the current scene are displayed. Therefore, it is easy to understand it a dependent relation between the actors that follows in a sequential order of the scenario and the resources being accessed.

Figure 8:
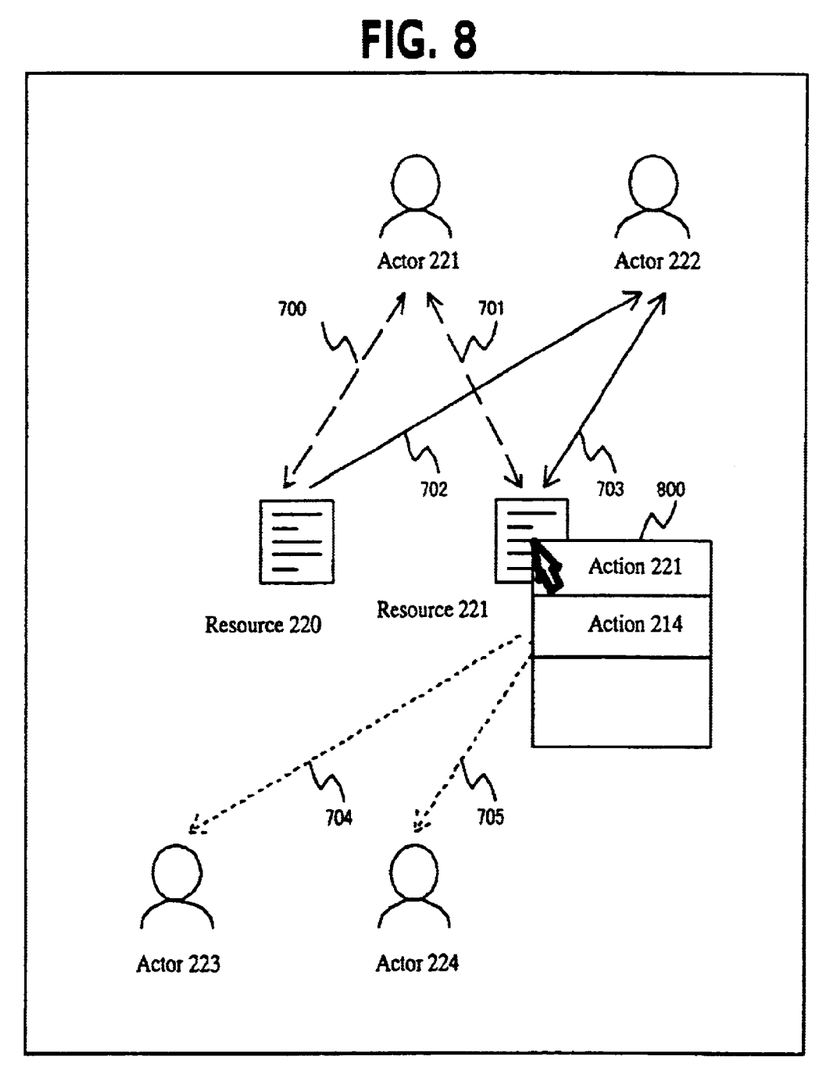
FIG. 8 illustrates an example of a display of related and dependence information of a current scene.

FIG. 8 is a diagram for explaining the operation of the screen that is shown on display 17 and the scene and dependence relations of the actors and resources of the scene. The thick arrow that is indicated on resource 221 is the cursor of the mouse. When selected by the mouse a window is opened, and an action name which was performed an action on the resource 221 is shown.

After showing the display screen that is shown in FIG. 7, either resource is indicated through an input device. Then, drawing processing unit 15 refers to the indicated resource in table 202 or acquires the action name of the action that is in the dependence relation that is renewed. And then, the acquired action name is displayed in an opened window. When either action name is indicated through an input device, a scene position in table 200 is referred to, and the action to be executed is acquired. Then, the scene position is set at scene position register 10. A display operation that the scene is made a current scene is executed. A process of the movement of control to dependence relation information renewal unit 12 and renewal of dependence relation information of the current scene is repeated. The current scene together with the scene position that corresponds to the window with an action name is be displayed.

In the present invention, the related information of the former scene and the back scene that are in dependence relation with respect to a current scene and resource is indicated generally and to the related the current scene. As a result the business specifications of other scenes in which a dependence relation is contained to resources accessed in the current scene can be easily grasped.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

We claim:

1. A scenario display method for displaying a scenario showing a sequential flow of a business process, said scenario including a plurality of sequential scenes, each of the scenes corresponding to a work unit included in the business process, said scenario display method comprising the steps of:

storing actions corresponding to actors executing the actions and resources accessed by the actors for each of a plurality of work units;

extracting a resource accessed in a first scene and a second scene of the plurality of scenes;

generating dependence relation information indicating a relation between the first scene and the second scene based on the extracted resource; and displaying the first scene, an actor accessing the extracted resource in the second scene and having dependence relation with the first scene, and an action executed by the actor accessing the extracted resource in the second scene and having dependence relation with the first scene by use of the generated dependence relation information.

2. A scenario display method according to claim 1, wherein the first scene is a current scene and the second scene occurs after the current scene.

3. A scenario display method according to claim 2, wherein the access type used to access said resource is a renewal type.

4. A scenario display method according to claim 3, wherein the second scene is a scene closest to the current scene.

5. A scenario display method according to claim 4, wherein said generating step is performed based on the closest scene that has been renewed.

6. A scenario display method according to claim 1, wherein the first scene is a current scene and the second scene occurs after the current scene.

7. A scenario display method according to claim 6, wherein the access type used to access said resources is a renewal type.

8. A scenario display method according to claim 7, wherein the second scene is a scene closest to a current scene.

9. A scenario display method according to claim 8, wherein said generating step is performed based on the closest scene that has been renewed.

10. A scenario display method according to claim 6, wherein the access type used to access said resources is a reference type.

11. A scenario display method according to claim 10, wherein said generating step is performed based on the closest scene that has been renewed.

12. A scenario display apparatus for displaying a scenario showing a sequential flow of a business process, said scenario including a plurality of sequential scenes, each of the scenes corresponding to a work unit included in the business processor, said scenario display apparatus comprising:

a display for displaying scenes;

a memory for storing actions corresponding to actors executing the actions and resources accessed by the actors for each of a plurality of work units; and a processing unit for extracting a resource accessed in a first scene and a second scene of a plurality of scenes, generating dependence relation information indicating a relation between the first scene and the second scene based on the extracted resource and displaying on said display the first scene, an actor accessing the extracted resource in the second scene and having dependence relation with the first scene and an action executed by the actor accessing the extracted resource in the second scene and having dependence relation with the first scene by use of the generated dependence relation information.

13. A scenario display apparatus according to claim 12, wherein the first scene is a current scene and the second scene occurs before the current scene.

14. A scenario display apparatus according to claim 13, wherein the access type used to access said resources is a renewal type.

15. A scenario display apparatus according to claim 14, wherein the second scene is a scene closest to the current scene.

16. A scenario display apparatus according to claim 15, wherein said generating is performed by said processor based on the closest scene that has been renewed.

17. A scenario display apparatus according to claim 12, wherein the first scene is a current scene and the second scene occurs after the current scene.

18. A scenario display apparatus according to claim 17, wherein the access type used to access said resources is a renewal type.

19. A scenario display apparatus according to claim 18, wherein the second scene is a scene closest to the current scene.

20. A scenario display apparatus according to claim 19, wherein said generating step is performed by said processor based on the closest scene that has been renewed.

21. A scenario display apparatus according to claim 17, wherein the access type used to access said resources is a reference type.

22. A scenario display apparatus according to claim 21, wherein said generating step is performed by said processor based on the closest scene that has been renewed.

* * * * *